United States Patent
Sakakida

(10) Patent No.: US 6,428,040 B2
(45) Date of Patent: Aug. 6, 2002

(54) DEVICE FOR CONTROLLING EXPANSION OF AN AIR BAG APPARATUS

(75) Inventor: Masafumi Sakakida, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/739,220

(22) Filed: Dec. 19, 2000

(30) Foreign Application Priority Data

Dec. 28, 1999 (JP) .............................. 11-373414

(51) Int. Cl.$^7$ .................................. B60R 21/32
(52) U.S. Cl. .......................... 280/735; 180/282
(58) Field of Search .................... 280/735; 701/45; 180/271, 282

(56) References Cited

U.S. PATENT DOCUMENTS

| | | | |
|---|---|---|---|
| 3,889,232 A | * | 6/1975 | Bell |
| 4,166,641 A | * | 9/1979 | Okada et al. |
| 4,958,851 A | * | 9/1990 | Behr et al. |
| 5,390,951 A | * | 2/1995 | Iyoda |
| 5,809,439 A | * | 9/1998 | Damisch |
| 6,070,113 A | * | 5/2000 | White et al. |
| 6,095,554 A | * | 8/2000 | Foo et al. |
| 6,167,335 A | * | 12/2000 | Ide et al. |
| 6,170,864 B1 | * | 1/2001 | Fujita et al. |
| 6,186,539 B1 | * | 2/2001 | Foo et al. |
| 6,198,387 B1 | * | 3/2001 | Dalum et al. |
| 6,246,937 B1 | * | 6/2001 | Miyaguchi et al. |
| 6,274,948 B1 | * | 8/2001 | Blank et al. |

FOREIGN PATENT DOCUMENTS

| | | |
|---|---|---|
| DE | 197 51 336 | 6/1998 |
| DE | 197 40 019 | 3/1999 |
| JP | 10-315907 | 12/1998 |
| WO | 97/48582 | 12/1997 |

* cited by examiner

Primary Examiner—Brian L. Johnson
Assistant Examiner—Tony Winner
(74) Attorney, Agent, or Firm—Nixon Peabody LLP.; Donald R. Studebaker

(57) ABSTRACT

A device for controlling an air bag apparatus includes a first acceleration sensor mounted in a passenger compartment for detecting an acceleration thereof and a second acceleration sensor mounted in a front portion of a vehicle body. A control unit electrically connected to the first and second acceleration sensors does not output an operation signal to a trigger circuit for inflaters until a first value derived from a signal detected by the first acceleration sensor has exceeded a first criterion and when a second value derived from a signal detected by the second acceleration sensor has exceeded a predetermined acceleration greater than an acceleration corresponding to the first criterion. In the event of a collision, because a very large impact force is applied to the front portion of the vehicle body, the control unit actuates the air bag apparatus appropriately based on the signals detected by both the first and second acceleration sensors. If a shock is applied to the vehicle body due to the run-up of a wheel onto a curb or the like, and even if the first acceleration sensor outputs a signal that allows actuation of the air bag apparatus, the second acceleration sensor does not output the operation signal, because it is not outputted until a further greater shock is applied to the vehicle body, thus preventing erroneous operation of the air bag apparatus.

6 Claims, 3 Drawing Sheets

|  | OFF | ON |
|---|---|---|
| 2ND THRESHOLD | EXPANSION | EXPANSION |
| 1ST THRESHOLD | NO EXPANSION | EXPANSION |
|  | NO EXPANSION | NO EXPANSION |

1ST SENSOR (vertical) / 2ND SENSOR (horizontal)

DEVICE FOR CONTROLLING EXPANSION OF AN AIR BAG APPARATUS

BACKGROUND OF THE INVENTION

1. Field of the Invention

The present invention relates to a device for controlling expansion of an air bag apparatus.

2. Description of the Related Art

Japanese Laid-open Patent Publication (unexamined) No. 10-31590 discloses a device for controlling expansion of an air bag apparatus having a plurality of inflaters. This device includes an acceleration sensor for detecting an acceleration of a passenger compartment and a crash sensor located at a front portion of a vehicle body and having a switching mechanism that closes an electric circuit in the event of a collision above a predetermined level. The device determines based on a signal from the acceleration sensor whether or not the inflaters should be operated, and also determines the operation modes of the inflaters according to the degree of the collision within a predetermined time after the electric circuit has been closed, making it possible to optimize the operation of the inflaters.

As in the device of the above-described construction, the general practice is such that whether the inflaters should be operated is determined based on the signal from the acceleration sensor. From the viewpoint of operating the air bag apparatus at an early stage, it is preferred that a criterion for determining the necessity of operating the air bag apparatus be set to the lowest possible value (acceleration).

However, such setting cannot deal with a recent tendency of wheels toward increase in size. More specifically, as shown in FIG. 4, if a wheel 101 (phantom line depicts a conventional wheel) runs up onto a curb 102 or the like, there is a possibility that the acceleration sensor detects an acceleration signal for expanding the inflaters notwithstanding that no collision has occurred, resulting in erroneous operation of the air bag apparatus.

SUMMARY OF THE INVENTION

The present invention has been developed to overcome the above-described disadvantages.

It is accordingly an objective of the present invention to provide a device for controlling expansion of an air bag apparatus, which is capable of positively preventing erroneous operation of the air bag apparatus that may occur when an automotive vehicle runs up onto a curb or the like.

In accomplishing the above and other objectives, the device according to the present invention includes a first acceleration sensor mounted in a passenger compartment for detecting an acceleration thereof, a second acceleration sensor mounted in a front portion of a vehicle body, and a control unit electrically connected to the first and second acceleration sensors so that signals from the first and second acceleration sensors are inputted to the control unit. When a first value derived from a signal detected by the first acceleration sensor has exceeded a first criterion and when a second value derived from a signal detected by the second acceleration sensor has exceeded a predetermined value greater than the first criterion, the control unit outputs an operation signal for operating the air bag apparatus.

By this construction, in the event of a collision, because a very large impact force is applied to the front portion of the vehicle body, not only the first value exceeds the first criterion, but the second value also exceeds the predetermined value. As a result, the control unit actuates the air bag apparatus appropriately. On the other hand, If a shock is applied to the vehicle body due to a run-up of a wheel onto a curb or the like, and even if the first acceleration sensor outputs a signal that allows actuation of the air bag apparatus, the second acceleration sensor does not output the operation signal. The reason for this is that the operation signal from the second acceleration sensor is set so as not be outputted until a further greater shock is applied to the vehicle body, thus preventing erroneous operation of the air bag apparatus.

Advantageously, the control unit outputs the operation signal regardless of the presence or absence of the signal detected by the second acceleration sensor, when the first value has exceeded a second criterion greater than the first criterion.

This construction ensures appropriate actuation of the air bag apparatus under the condition in which the air bag apparatus should normally be actuated unless the second acceleration sensor is out of order (in the event of failure) or in which the air bag apparatus cannot be actuated by reason that the second acceleration sensor cannot detect the predetermined acceleration, although it is in good order (in the event of, for example, a rear end collision or a collision in which the vehicle rushes under a large vehicle).

The second criterion is so set as to be greater than the predetermined value. By so setting, the device according to the present invention can distinguish a shock caused by the run-up onto a curb or the like from a shock caused by a vehicle collision, making it possible to prevent erroneous operation of the air bag apparatus and guarantee appropriate actuation of the air bag apparatus.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENTS

This application is based on an application No. 11-373414 filed Dec. 28, 1999 in Japan, the content of which is herein expressly incorporated by reference in its entirety.

Figure 1:
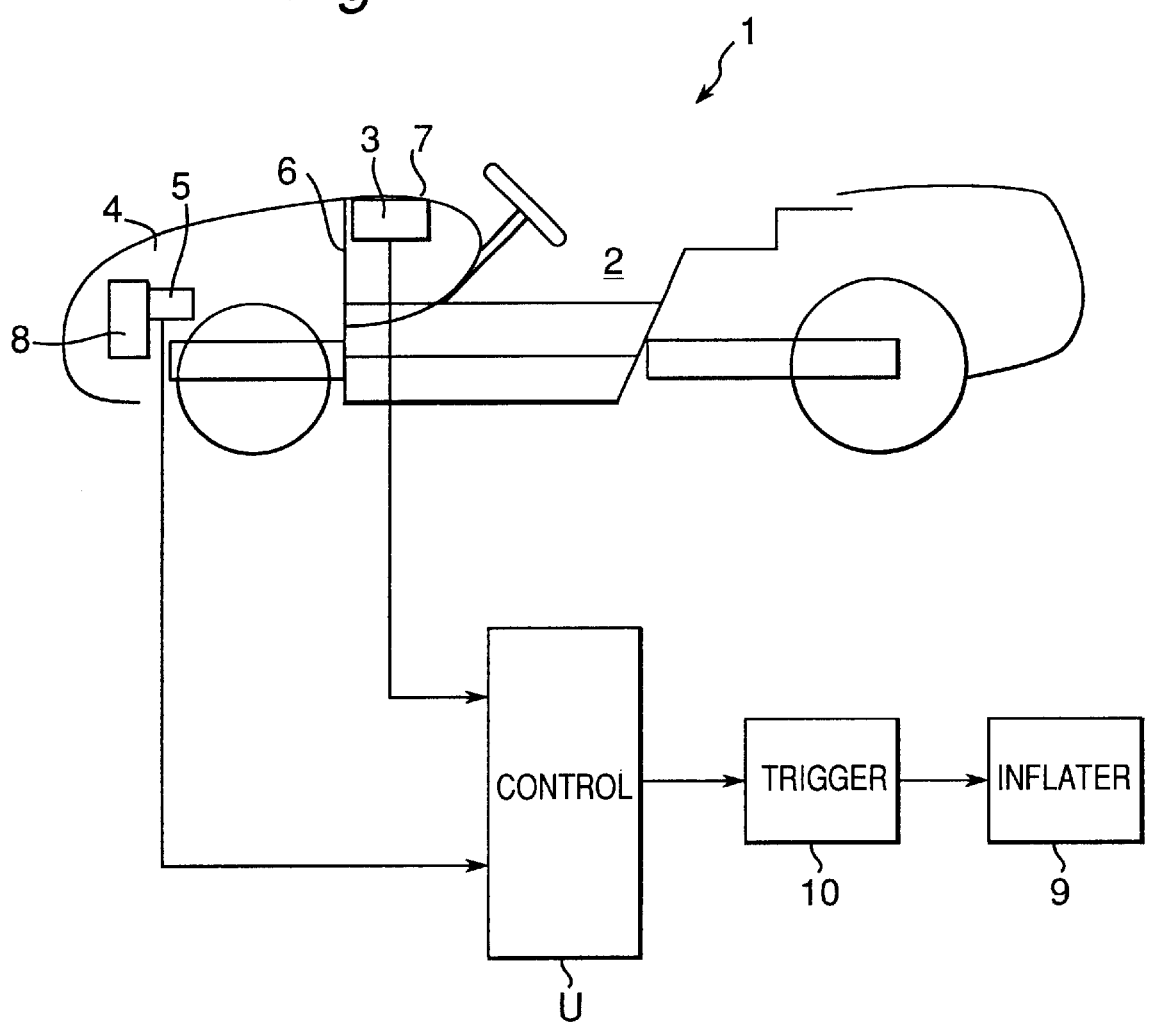
FIG. 1 is a block diagram of a device according to the present invention.

Referring now to the drawings, there is schematically shown in FIG. 1 an automotive vehicle 1 having a first acceleration sensor or detector 3 mounted in a passenger compartment 2 defined therein and a second acceleration sensor or detector 5 mounted in a front portion 4 of a vehicle body and located forwardly of the first acceleration sensor 3.

In this embodiment, the first acceleration sensor 3 is installed on a cowl upper panel 6 substantially at the center thereof in the widthwise direction of the vehicle body, and is covered with an instrument panel 7. The first acceleration sensor 3 is a sensor for outputting an acceleration signal while always detecting the acceleration.

On the other hand, the second acceleration sensor 5 is installed on a rear face of a bumper reinforcement 8 substantially at the center thereof in the widthwise direction of the vehicle body. The second acceleration sensor 5 outputs an operation signal by detecting an acceleration over a predetermined acceleration value (criterion) in the event of a collision. By way of example, the second acceleration sensor 5 includes a magnet, a mass always attracted by the magnet, and a pair of contacts disposed close to the mass, wherein in the event of collision, the mass moves towards the contacts against the attraction of the magnet to turn the contacts on.

As shown in FIG. 1, the signals from the first and second acceleration sensors 3, 5 are inputted to a control unit U electrically connected thereto, which outputs an operation signal to a trigger circuit 10 for operating inflaters (air bags) 9 based on such signals. The control by the control unit U is as follows.

Figures 2, 4:
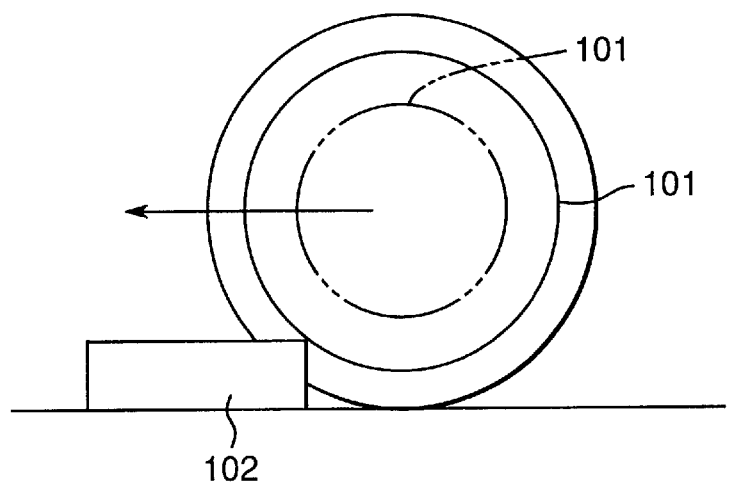
FIG. 2 is a diagram explanatory of the setting of first and second acceleration sensors installed in the device of FIG. 1.
FIG. 4 is a schematic view when a wheel runs up onto a curb.

In principle, the control unit U integrates a signal detected by the first acceleration sensor 3 and then determines whether or not the integrated value exceeds a first threshold value (basic criterion). The control unit U also determines the presence or absence of an operation signal from the second acceleration sensor 5. As shown in FIG. 2, the control unit U does not output the operation signal to the trigger circuit 10 for the inflaters 9, until the integrated value of the signal detected by the first acceleration sensor 3 exceeds the first threshold value, and the control unit U determines that the operation signal has been outputted from the second acceleration sensor 5. The criterion or the predetermined acceleration value of the second acceleration sensor 5 is set to be greater than the acceleration (converted value) corresponding to the first threshold value.

By so setting, in the event of an ordinary collision, the air bags are caused to expand appropriately, while if a wheel runs up onto or the like, and even if the expansion of the air bags is allowed based on the signal from the first acceleration sensor 3, the second acceleration sensor 5 does not output the operation signal and, hence, erroneous operation of the air bags is prevented.

When the control unit U determines that the value (integrated value) derived from the signal detected by the first acceleration sensor 3 has exceeded a second threshold value (a second criterion) greater than the first threshold value, the control unit U outputs the operation signal to the trigger circuit 10 for the inflaters 9 regardless of the value detected by the second acceleration sensor 5, as shown in FIG. 2. This is to expand the air bags in the event of failure or damage of the second acceleration sensor 5 or in the event of a rear end collision of the vehicle body.

The acceleration (converted value) corresponding to the second threshold value is set to be greater than the predetermined acceleration (criterion) used for comparison with the value detected by the second acceleration sensor 5. This is for the purpose of expanding the air bags appropriately under the condition in which the air bags should normally be expanded unless the second acceleration sensor 5 is out of order (in the event of failure) or in which the air bags cannot be expanded by reason that the second acceleration sensor 5 cannot detect the necessity of expanding the air bags, although it works well (in the event of, for example, a rear end collision).

Figure 3:
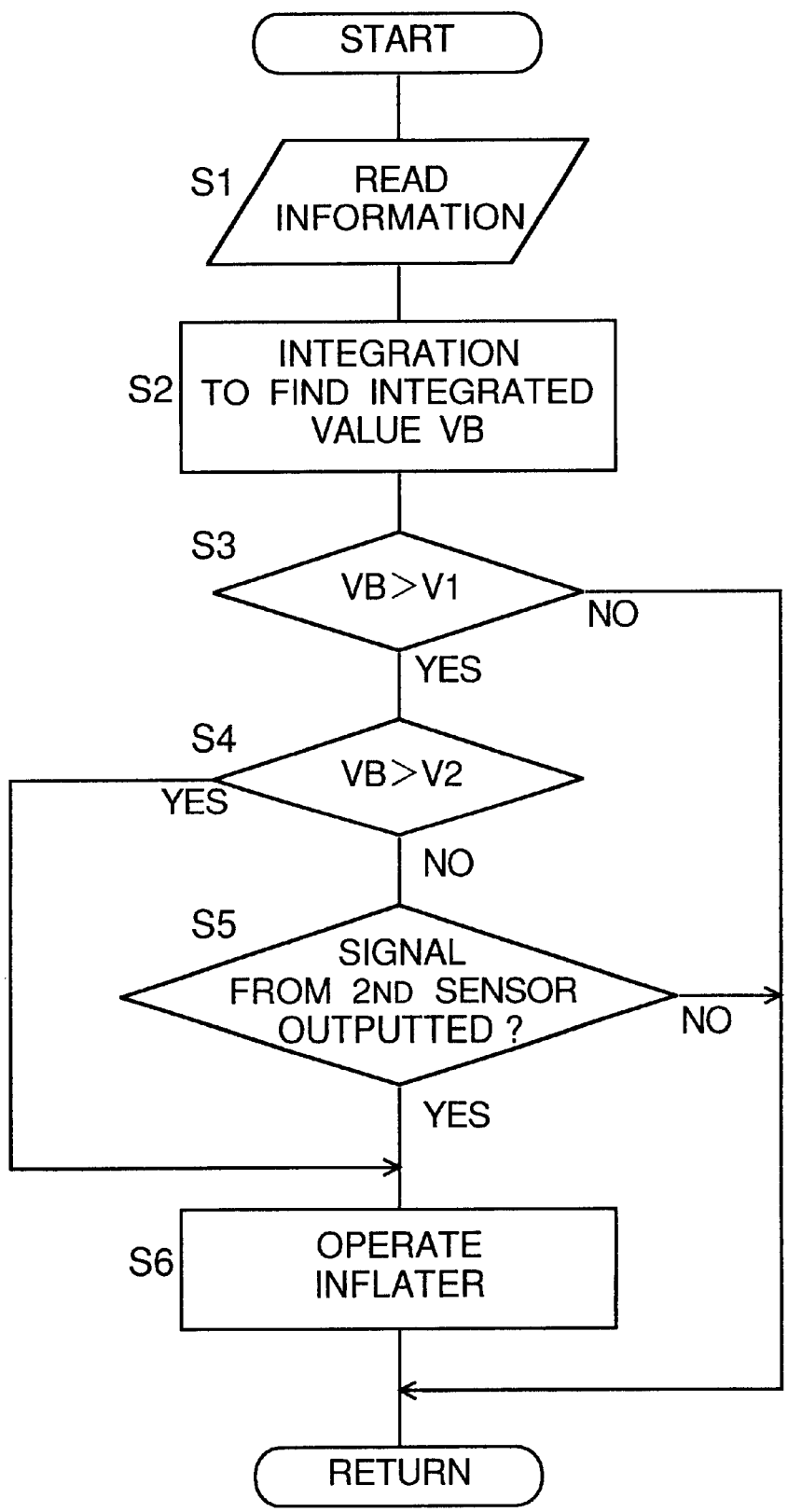
FIG. 3 is a flowchart explanatory of how to control expansion of air bags in the device of FIG. 1.

FIG. 3 depicts a flowchart showing a good representative of the control by the control unit U.

According to this flowchart, at step S1, the signals from the first and second acceleration sensors 3, 5 are inputted to the control unit U, which in turn uses them to determine whether the air bags should be expanded or not.

At step S2, the signal detected by the first acceleration sensor 3 undergoes integration processing, and at step S3, a determination is made whether or not an integrated value VB obtained at step S2 is greater than the first threshold value V1. This is to determine if a vehicle collision has occurred, based on the signal from the first acceleration sensor 3.

If the determination at step S3 is YES, a determination is made at step S4 whether or not the integrated value VB has exceeded the second threshold value V2. This is to determine, in the event of failure of the second acceleration sensor 5 or occurrence of a rear end collision, the necessity of expanding the air bags regardless of the presence or absence of the operation signal from the second acceleration sensor 5.

The acceleration corresponding to the second threshold value V2 is set to be greater than the criterion or predetermined acceleration used for comparison with the signal from the second acceleration sensor 5. This guarantees the operation of the air bags even if the second acceleration sensor 5 is out of order or a rear end collision occurs.

If the determination at step S4 is NO, a determination is made at step S5 whether or not the operation signal is outputted from the second acceleration sensor 5. This is to determine whether a shock is caused by a collision or by a run-up of a wheel onto a curb or the like.

The criterion i.e., the predetermined reference acceleration for the second acceleration sensor 5 is set to be greater than the acceleration corresponding to the first threshold value. In the event of a collision, because a very large impact force is applied to the front portion 4 of the vehicle body, even if the criterion for the output signal from the second acceleration sensor 5 is set greater than the acceleration corresponding to the first threshold value, the second acceleration sensor 5 does not fail to output the operation signal. On the other hand, if a shock is applied to the vehicle body due to the run-up of a wheel onto a curb or the like, and even if the first acceleration sensor 3 outputs a signal (the integrated value thereof exceeds the first threshold value) that allows expansion of the air bags, the second acceleration sensor 5 does not output the operation signal in response to the shock of such a degree.

If the determination at step S5 is YES, which means that both the first and second acceleration sensors 3,5 have detected a vehicle collision, the control unit U outputs an operation signal to the trigger circuit 10, which in turn actuates the inflaters 9.

In contrast, if the determination at step S5 is NO, which means that a shock detected by the first acceleration sensor 3 is caused not by a vehicle collision but by the run-up onto a curb or the like, the operation signal from the control unit U is not outputted to the trigger circuit 10 for the inflaters 9, and the procedure returns to step S1.

If the determination at step S4 is YES, which means that the air bags should be expanded regardless of the presence or absence of the operation signal from the second acceleration sensor 5, the procedure advances to step S6 at which the operation signal is inputted to the trigger circuit 10 for the inflaters 9. This guarantees the appropriate operation of the air bags even if the second acceleration sensor 5 is out of order or a rear end collision occurs.

If the determination at step S3 is NO meaning no collision, the operation signal is not outputted to the trigger circuit 10 for the inflaters 9, and the procedure returns to step S1.

It is to be noted that although in this embodiment the first and second criteria or threshold values and the predetermined acceleration value for the second acceleration sensor 5 are common in terms of the reference values for determining the degree of collision, their units differ from each other and, hence, the magnitudes thereof have been determined by converting the first and second threshold values to respective acceleration values. However, if all of the reference values are so determined as to have the same unit, no conversion is necessary prior to comparison.

It is also to be noted that although in the above-described embodiment the second acceleration sensor 5 has been described as outputting an operation signal when the value detected thereby exceeds a predetermined acceleration value, it may be so designed that the second acceleration sensor 5 always outputs the operation signal to the control unit U, which in turn determines whether or not the value detected by the second acceleration sensor 5 has exceeded the predetermined acceleration value.

It is further to be noted that although in the above-described embodiment an integrated value of a signal (acceleration) detected by the first acceleration sensor is used as a factor for determining expansion of the air bags upon comparison thereof with the first or second threshold value, the expansion of the air bags may be determined by comparing the acceleration with the first or second threshold value. In that case, it is natural that the first and second threshold values are determined in terms of acceleration.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A device for controlling an air bag apparatus including an inflatable air bag and mounted in an automotive vehicle having a passenger compartment defined therein, said device comprising:

a first acceleration sensor mounted in the passenger compartment for detecting an acceleration thereof;

a second acceleration sensor mounted in a front portion of the vehicle body; and a control unit electrically connected to said first and second acceleration sensors so that signals from said first and second acceleration sensors are inputted to said control unit;

wherein when a first value derived from a signal detected by said first acceleration sensor has exceeded a first criterion and when a second value derived from a signal detected by said second acceleration sensor has exceeded a predetermined value greater than the first criterion, said control unit outputs an expansion signal for causing the air bag apparatus to inflate the air bag.

2. The device according to claim 1, wherein said control unit outputs the expansion signal regardless of presence or absence of the signal detected by said second acceleration sensor, when the first value has exceeded a second criterion greater than the first criterion.

3. The device according to claim 2, wherein the second criterion is greater than the predetermined value.

4. A device for controlling an air bag apparatus including an inflatable air bag and mounted in an automotive vehicle having a passenger compartment defined therein, said device comprising:

a first acceleration detector for always detecting an acceleration of the passenger compartment;

a control unit for determining necessity of operating the air bag apparatus by comparing a first value derived from a signal detected by said first acceleration detector with a first criterion; and a second acceleration detector mounted in a front portion of the vehicle body for outputting an operation signal when a second value derived from a signal detected by said second acceleration detector has exceeded a predetermined value greater than the first criterion;

wherein when the first value has exceeded the first criterion and when said second acceleration detector has outputted the operation signal, said control unit outputs an expansion signal for causing the air bag apparatus to inflate the air bag.

5. The device according to claim 4, wherein said control unit outputs the expansion signal regardless of presence or absence of the operation signal from said second acceleration detector, when the first value has exceeded a second criterion greater than the first criterion.

6. The device according to claim 5, wherein the second criterion is greater than the predetermined value.

* * * * *